(12) United States Patent
Koie

(10) Patent No.: US 12,394,571 B2
(45) Date of Patent: Aug. 19, 2025

(54) SOLID-ELECTROLYTE CAPACITOR AND METHOD FOR MANUFACTURING SAME

(71) Applicant: Panasonic Intellectual Property Management Co., Ltd., Osaka (JP)

(72) Inventor: Syusaku Koie, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 139 days.

(21) Appl. No.: 18/547,156

(22) PCT Filed: Feb. 22, 2022

(86) PCT No.: PCT/JP2022/007214
§ 371 (c)(1),
(2) Date: Aug. 19, 2023

(87) PCT Pub. No.: WO2022/185999
PCT Pub. Date: Sep. 9, 2022

(65) Prior Publication Data
US 2024/0128026 A1  Apr. 18, 2024

(30) Foreign Application Priority Data
Mar. 3, 2021  (JP) ................... 2021-033893

(51) Int. Cl.
*H01G 9/028* (2006.01)
*H01G 9/048* (2006.01)
(Continued)

(52) U.S. Cl.
CPC ............. *H01G 9/028* (2013.01); *H01G 9/048* (2013.01); *H01G 9/14* (2013.01); *H01G 9/15* (2013.01)

(58) Field of Classification Search
None
See application file for complete search history.

(56) References Cited

U.S. PATENT DOCUMENTS 9,627,144 B2 * 4/2017 Yamazaki ............... H01G 9/028
10,600,579 B2 * 3/2020 Uka ........................ H01G 9/15
(Continued)

FOREIGN PATENT DOCUMENTS

| CN | 111630617 A | * 9/2020 | ........... H01G 9/0036 |
| JP | 2003289015 A | * 10/2003 | ............. H01G 11/48 |

(Continued)

OTHER PUBLICATIONS

Translation of JP 2003289015 (Year: 2003).*
(Continued)

*Primary Examiner* — Dion R. Ferguson
(74) *Attorney, Agent, or Firm* — Rimon P.C.

(57) ABSTRACT

A solid electrolytic capacitor includes at least one solid electrolytic capacitor element that includes an anode body having a sheet shape and including a porous part in a surface layer of the anode body, a dielectric layer covering at least a part of the porous part, and a cathode part. The cathode part includes a solid electrolyte layer covering at least a part of the dielectric layer. The solid electrolyte layer includes a first layer covering the at least the part of the dielectric layer, and a second layer covering at least a part of the first layer. The first layer includes an inner layer disposed in voids of the porous part, and an outer layer disposed outside a main surface of the porous part. A thickness Tm of the outer layer disposed outside the main surface is more than or equal to 1 μm.

4 Claims, 1 Drawing Sheet

(51) Int. Cl.
*H01G 9/14* (2006.01)
*H01G 9/15* (2006.01)

(56) References Cited

U.S. PATENT DOCUMENTS

| | | | |
|---|---|---|---|
| 11,521,801 B2* | 12/2022 | Hong | H01G 11/36 |
| 2012/0044615 A1 | 2/2012 | Takahashi et al. | |
| 2015/0332856 A1* | 11/2015 | Morioka | H01G 9/042 |
| | | | 427/80 |
| 2017/0092430 A1* | 3/2017 | Uka | H01G 9/0032 |
| 2018/0005759 A1* | 1/2018 | Uka | H01G 9/025 |
| 2022/0084756 A1* | 3/2022 | Fukui | H01G 9/15 |
| 2024/0128026 A1* | 4/2024 | Koie | H01G 9/15 |

FOREIGN PATENT DOCUMENTS

| | | | | |
|---|---|---|---|---|
| JP | 4623404 B2 * | 2/2011 | | H01G 11/56 |
| JP | 2012-043958 | 3/2012 | | |
| JP | 2017098297 A * | 6/2017 | | H01G 9/012 |
| JP | 2018-082082 | 5/2018 | | |
| JP | 2019220567 A * | 12/2019 | | H01G 13/00 |
| WO | WO-2013024532 A1 * | 2/2013 | | H01G 9/0036 |
| WO | WO-2013080486 A1 * | 6/2013 | | H01G 9/028 |
| WO | WO-2016157769 A1 * | 10/2016 | | C25B 1/04 |

OTHER PUBLICATIONS

JP 4323404 Translation (Year: 2011).*
International Search Report of PCT application No. PCT/JP2022/007214 dated May 24, 2022.

* cited by examiner

SOLID-ELECTROLYTE CAPACITOR AND METHOD FOR MANUFACTURING SAME

TECHNICAL FIELD

The present disclosure relates to a solid electrolytic capacitor and a method for manufacturing the same.

BACKGROUND

A solid electrolytic capacitor includes a solid electrolytic capacitor element, a resin exterior body or case that seals the solid electrolytic capacitor element, and an external electrode electrically connected with the solid electrolytic capacitor element. A solid electrolytic capacitor element includes an anode body, a dielectric layer formed on a surface of the anode body, and a cathode part that covers at least a part of the dielectric layer. The cathode part includes a solid electrolyte layer covering at least a part of the dielectric layer and containing a conductive polymer.

The solid electrolyte layer may be composed of multiple layers. For example, Unexamined Japanese Patent Publication No. 2012-43958 proposes a solid electrolytic capacitor including an anode conductor made of a porous valve metal, a dielectric layer formed on a surface of the anode conductor, and a solid electrolyte layer composed of a conductive polymer layer formed on a surface of the dielectric layer. The solid electrolyte layer includes a first solid electrolyte layer formed on a surface of the dielectric layer and a second solid electrolyte layer formed on a surface of the first solid electrolyte layer. Then, at least one continuous or discontinuous layer made of an amine compound exists between the first solid electrolyte layer and the second solid electrolyte layer, and in the second solid electrolyte layer.

SUMMARY

A solid electrolytic capacitor according to a first aspect of the present disclosure includes at least one solid electrolytic capacitor element that includes: an anode body having a sheet shape and including a porous part in a surface layer of the anode body; a dielectric layer covering at least a part of the porous part; and a cathode part covering at least a part of the dielectric layer. The cathode part includes a solid electrolyte layer covering the at least the part of the dielectric layer. The solid electrolyte layer includes a first layer containing a first conductive polymer and covering the at least the part of the dielectric layer, and a second layer containing a second conductive polymer and covering at least a part of the first layer. The first layer includes an inner layer disposed in voids of the porous part, and an outer layer disposed outside a main surface of the porous part A thickness Tm of the outer layer disposed outside the main surface is more than or equal to 1 µm.

A method for manufacturing a solid electrolytic capacitor according to a second aspect of the present disclosure, the solid electrolytic capacitor including at least one solid electrolytic capacitor element. The at least one solid electrolytic capacitor element includes: an anode body having in a sheet shape and including a porous part in a surface layer of the anode body; a dielectric layer covering at least a part of the porous part; and a cathode part covering at least a part of the dielectric layer. The cathode part includes a solid electrolyte layer covering the at least the part of the dielectric layer. The solid electrolyte layer includes a first layer containing a first conductive polymer and covering the at least the part of the dielectric layer, and a second layer containing a second conductive polymer and covering at least a part of the first layer. The method includes a step of forming the first layer by applying a treatment liquid containing the first conductive polymer to one main surface of the porous part while the one main surface is directed vertically upward, and then applying the treatment liquid to another main surface of the porous part while the another main surface is directed vertically upward, and drying the treatment liquid.

The present disclosure provides a solid electrolytic capacitor capable of reducing a decrease in electrostatic capacity in repeated use, and a method for manufacturing the solid electrolytic capacitor.

DESCRIPTION OF EMBODIMENT

Figure 1:
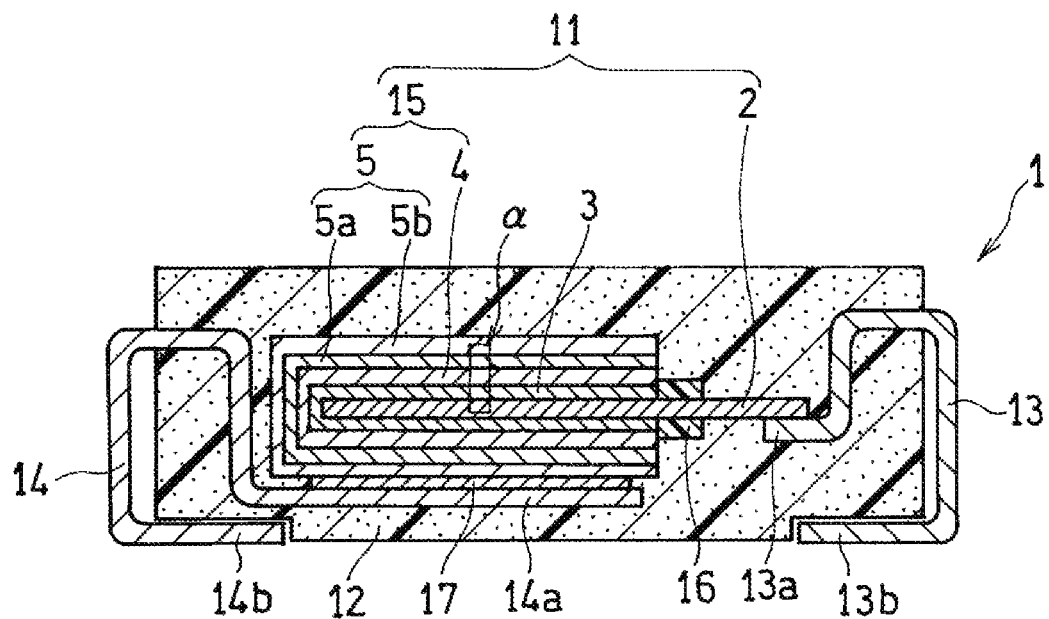
FIG. 1 is a schematic sectional view illustrating a solid electrolytic capacitor according to an exemplary embodiment of the present disclosure.

Prior to the description of an exemplary embodiment, problems in the prior art are briefly described below.

A solid electrolyte layer of a solid electrolytic capacitor expands or contracts due to charge and discharge, heat, or the like. Thus, adhesion of the solid electrolyte layer to a dielectric layer is likely to decrease, and peeling of the solid electrolyte layer is likely to occur. In particular, when the solid electrolyte layer includes multiple layers, the multiple layers are different in degree of expansion or contraction. Thus, in addition to the above, adhesion between the multiple layers decreases, and peeling between the multiple layers is likely to occur.

The solid electrolyte layer can be formed, for example, by applying a treatment liquid containing a conductive polymer to an anode body including a porous part that includes a dielectric layer. When a layer (first layer) containing a conductive polymer (first conductive polymer) covering at least a part of the dielectric layer is formed using such a treatment liquid, a method for immersing the anode body including the porous part that includes the dielectric layer in the treatment liquid is typically used from the viewpoint of ensuring high productivity. Unfortunately, the immersion causes only a small amount of the treatment liquid to adhere to the porous part, so that the first layer is formed while being disposed in voids (referred to also as pits) of the porous part, and thus is hardly formed on a main surface of the porous part. Even when a layer (second layer) containing a conductive polymer (second conductive polymer) is formed to cover at least a part of the first layer in such a state, few contact points between the first layer and the second layer are formed. Thus, when the solid electrolytic capacitor is repeatedly used or exposed to a high temperature to cause each layer to expand or contract, sufficient adhesion between the layers cannot be maintained, and thus peeling is likely to occur. In addition, the dielectric layer and the first layer may peel from each other due to expansion or contraction of the first layer. The second layer may be formed on a surface of dielectric layer that is not covered with the first layer. In such a state, the dielectric layer and the second layer are peeled from each other due to expansion and contraction of the second layer. These cases cause a difficulty in ensuring sufficient adhesion between the dielectric layer and the solid electrolyte layer. When peeling occurs between the dielectric layer and the solid electrolyte layer or between layers constituting the solid electrolyte layer, capacitor performance is deteriorated, such as a decrease in electrostatic capacity or an increase in equivalent series resistance (ESR).

In view of the above, a solid electrolytic capacitor of the present disclosure includes a solid electrolyte layer including a first layer and a second layer. The first layer includes an inner layer disposed in voids of a porous part including a dielectric layer, and an outer layer disposed outside a main surface of the porous part including the dielectric layer. A thickness Tm of the outer layer disposed outside the main surface is more than or equal to 1 μm.

The first layer as described above can be formed by applying a treatment liquid (first treatment liquid) containing the first conductive polymer to one main surface while the one main surface of the porous part including the dielectric layer is directed vertically upward, and then applying the first treatment liquid to the other main surface while the other main surface is directed vertically upward, and drying the first treatment liquid.

Unlike the conventional immersion, the treatment liquid is applied while each main surface of the porous part including the dielectric layer is directed vertically upward. Thus, the amount of the first treatment liquid to be applied onto each main surface can be increased while voids of the porous part are filled with the first conductive polymer. A large amount of the first conductive polymer can be attached onto the main surface, so that the thickness Tm of the outer layer disposed outside the main surface can be increased to be more than or equal to 1 μm. Then, the number of contact points between the first layer and the second layer can be increased, so that adhesion between the first layer and the second layer improves. Additionally, the voids are filled with the first conductive polymer, and a large amount of the first conductive polymer is attached to the porous part including the dielectric layer, so that adhesion between the dielectric layer and the first layer improves. Thus, even when each layer constituting the solid electrolyte layer repeats expansion and contraction due to repeated use of the solid electrolytic capacitor, not only peeling between layers but also peeling between the dielectric layer and the solid electrolyte layer is reduced. As a result, a decrease in electrostatic capacity is reduced. Additionally, an increase in ESR can be reduced. Even when the solid electrolytic capacitor is repeatedly used, excellent capacitor performance is maintained, and thus the solid electrolytic capacitor can be improved in reliability.

Improving adhesion between not only the first layer and the second layer, but also the dielectric layer and the solid electrolyte layer, reduces peeing not only between layers but also between the dielectric layer and the solid electrolyte layer even when the solid electrolytic capacitor is exposed to a high temperature to cause each layer constituting the solid electrolyte layer to expand or contract. Thus, not only a decrease in electrostatic capacity but also an increase in ESR can be suppressed even in this case. As described above, the solid electrolytic capacitor exhibits excellent heat resistance, so that the solid electrolytic capacitor can be improved in reliability from the viewpoint of heat resistance.

The anode body in a sheet shape has a pair of main surfaces occupying most of a surface of the anode body, and end surfaces located at respective ends of each of the main surfaces. The main surfaces and the end surfaces form an outer shape in a sheet shape of the anode body. The anode body in a sheet shape includes a porous part in a surface layer. The solid electrolyte layer is formed at least in a part where the porous part of the anode body is formed. The solid electrolyte layer includes the first layer covering at least a part of the dielectric layer, the first layer being divided into an inner layer and an outer layer across a main surface (or end surface) of the porous part in which the dielectric layer is formed, the inner layer being a part existing inside the main surface (or end surface), and the outer layer being a part protruding outward from the main surface (or end surface). The inner layer is disposed in voids of the porous part in which the dielectric layer is formed.

In the step of forming the first layer, the state in which the main surface of the porous part including the dielectric layer is directed vertically upward requires a state in which the main surface of the porous part including the dielectric layer, to which the first treatment liquid is to be applied, is directed vertically upward. Although the main surface is not necessarily perpendicular to the vertical direction, the main surface is preferably perpendicular to the vertical direction or inclined in a range from 80° to 100° with respect to the vertical direction when the first treatment liquid is applied, from the viewpoint of equalizing the amount of the first treatment liquid held over the entire main surface.

Hereinafter, the solid electrolytic capacitor of the present disclosure and a method for manufacturing the solid electrolytic capacitor will be described more specifically with reference to the drawings as necessary.

[Solid Electrolytic Capacitor]

The solid electrolytic capacitor includes a solid electrolytic capacitor element including anode body in a sheet shape with a surface layer including a porous part, a dielectric layer covering at least a part of the porous part, and a cathode part covering at least a part of the dielectric layer. The solid electrolytic capacitor element may be simply referred to below as a capacitor element.

(Anode Body)

The anode body may include a valve metal, an alloy containing the valve metal, a compound containing the valve metal, or the like. These materials may be used singly or in combination of two or more kinds of these materials. Preferably available examples of the valve metal include aluminum, tantalum, niobium, and titanium.

The anode body has a sheet shape. The sheet shape includes a foil shape and a plate shape.

The anode body typically includes an anode lead-out part and a cathode formation part. The cathode formation part of the anode body has a surface on which the cathode part including the solid electrolyte layer is formed.

The anode body includes a porous part in a surface layer. The porous part may be formed in not only the surface layer of the anode body, but also a part other than the surface layer. The anode body may include the porous part in the surface layer of at least a part of the cathode formation part, and may include the porous part in the surface layer of the entire cathode formation part, for example. The porous part may be formed in a surface layer of the anode lead-out part. The anode body including the porous part in the surface layer is formed by roughening a surface of a base material, specifically a base material in a sheet shape, containing a valve metal, for example. The anode body including the porous part in the surface layer of the cathode formation part is formed by roughening a surface of a part of the base material, the part corresponding to the cathode formation part, for example. The roughening can be performed by etching treatment (e.g., electrolytic etching), for example.

(Dielectric Layer)

The dielectric layer is an insulating layer that functions as a dielectric. The dielectric layer is formed by anodizing the valve metal of the surface of the anode body by anodizing treatment or the like. The dielectric layer may be formed covering at least a part of the porous part of the anode body. The dielectric layer is typically formed on the surface of the anode body. Thus, the dielectric layer is formed along unevenness of the surface of the anode body and an inner wall surface of a void in the porous part.

The dielectric layer is formed on a surface of at least a part of the cathode formation part of the anode body, for example. The dielectric layer may be formed on a surface of at least a part of the anode lead-out part of the anode body as necessary.

The dielectric layer contains an oxide of the valve metal. For example, when tantalum is used as the valve metal, the dielectric layer contains $Ta_2O_5$, and when aluminum is used as the valve metal, the dielectric layer contains $Al_2O_3$. The dielectric layer is not limited to these examples, and may be made of a material that functions as a dielectric.

(Cathode Part)

The cathode part includes at least the solid electrolyte layer covering at least a part of the dielectric layer. The cathode part is typically formed on the surface of the cathode formation part of the anode body with the dielectric layer interposed between the cathode part and the cathode formation part. The cathode part typically includes the solid electrolyte layer, and a cathode lead-out layer covering at least a part of the solid electrolyte layer. Hereinafter, the solid electrolyte layer and the cathode lead-out layer will be described.

(Solid Electrolyte Layer)

The solid electrolyte layer is formed covering the dielectric layer. The entire dielectric layer (the entire surface of the dielectric layer) is not necessarily covered with the solid electrolyte layer, so that the solid electrolyte layer is required to be formed covering at least a part of the dielectric layer. The solid electrolyte layer includes a first layer containing a first conductive polymer covering at least a part of the dielectric layer, and a second layer containing a second conductive polymer covering at least a part of the first layer. For the dielectric layer on which a region where the first layer is not formed exists, the second layer may be formed on the dielectric layer in the region. The second layer may be formed of a single layer or may be formed of multiple layers.

Each of the first conductive polymer and the second conductive polymer includes a conjugated polymer, for example. Each of the first conductive polymer and the second conductive polymer may contain a dopant as necessary. Each of the first layer and the second layer may contain an additive agent as necessary.

The first layer is different in composition from at least a layer of the second layer, the layer being in contact with the first layer. Examples of the case, "different in compositions", includes a case where at least one selected from a group consisting of a conjugated polymer, a dopant, and an additive agent contained in each layer is different, and a case where contents of components contained in each layer are different. When the second layer includes multiple layers, each layer may be different or identical in composition. The second layer includes a layer that is not in contact with the first layer and that may be identical to or different from the first layer in composition.

The first layer and the second layer can be distinguished by analysis of a sectional image using an electron probe micro analyzer (EPMA), for example. For example, performing the analysis using the EPMA at equal intervals for a sectional image of the solid electrolyte layer enables determining a boundary between the first layer and the second layer from a difference in wavelength of a characteristic X-ray at each measurement point.

The first layer includes an inner layer disposed in voids of the porous part including the dielectric layer, and an outer layer disposed outside a main surface and an end surface of the porous part in which the dielectric layer is formed. The inner layer enables enhancing adhesion between the first layer and the porous part. The outer layer enables enhancing adhesion between the first layer and the second layer. As a result, adhesion between the porous part and the second layer is enhanced, and thus enabling suppression of a decrease in electrostatic capacity when the solid electrolytic capacitor is repeatedly used or the solid electrolytic capacitor is exposed to a high temperature.

The thickness Tm of the outer layer disposed outside the main surface of the porous part in which the dielectric layer is formed is more than or equal to 1 µm, and preferably more than or equal to 2 µm, and may be more than or equal to 2.3 µm, 2.5 µm, or 2.8 µm. Thickness Tm in such a range enables improving adhesion between the outer layer and the second layer, and suppressing peeling between the first layer and the second layer. Thus, a decrease in electrostatic capacity when the solid electrolytic capacitor is repeatedly used or the solid electrolytic capacitor is exposed to a high temperature can be suppressed. Thickness Tm has an upper limit that is not particularly limited. Thickness Tm may be less than or equal to 20 µm, for example. Thickness Tm in such a range enables reducing expansion of the solid electrolyte layer during drying, so that capacitor performance can be further stabilized.

As described above, the first layer is formed by applying the treatment liquid containing the first conductive polymer to the main surface of the porous part including the dielectric layer while the main surface of the porous part is directed vertically upward, and drying the treatment liquid. Thus, a thickness Te of the outer layer disposed outside the end surface is smaller than thickness Tm of the outer layer disposed outside the main surface of the porous part including the dielectric layer. Thickness Te is smaller than thickness Tm, so that gas is easily released from the end surface even with a large amount of treatment liquid applied to the main surface. This configuration allows the treatment liquid to be easily filled also in the voids, and thus enables the adhesion between the porous part and the first layer to be further improved.

A ratio of thickness Tm to thickness Te (=Tm/Te) is preferably more than or equal to 10, and may be more than or equal to 15 or 20. Ratio Tm/Te in such a range facilitates obtaining higher adhesion between the porous part and the first layer. Ratio Tm/Te has an upper limit that is not particularly limited. Thickness Te may be 0 µm, or more than 0 µm, for example. Thickness Te is less than or equal to 0.5 µm, and may be less than or equal to 0.1 µm, for example. The range has lower and upper limit values each of which can be appropriately determined.

Thickness Tm and thickness Te are each an average thickness of an outer layer of the first layer measured for a sectional image of the solid electrolyte layer at a predetermined position of the capacitor element. The average thickness of the outer layer is an average value of thicknesses of the outer layer on the main surface or the end surface measured at any multiple positions. The thickness of the outer layer is measured based on a roughness curve of the main surface or the end surface of the porous part in which the dielectric layer is formed, as a reference of a thickness of 0 mm. The sectional image of the solid electrolyte layer is acquired by a scanning electron microscope, for example, for a region including at least an interface between the porous part and the first layer and an interface between the first layer and the second layer. Image analysis of the acquired sectional image derives a roughness curve indicating the main surface or the end surface of the porous part. The roughness curve is defined in JIS B 0601: 2013. Thickness of the outer layer on the main surface is measured at ten measurement points, for example, and thickness of the outer layer on the end surface is measured at four measurement points, for example.

For the measurement of thickness Tm or thickness Te, a sample (sample A) obtained by the following procedure can be used. First, a solid electrolytic capacitor or a capacitor element is embedded in a curable resin, and the curable resin is cured. Polishing treatment or cross-section polishing processing is applied to a cured product to expose a section of the cured product, the section being parallel to the thickness direction of the solid electrolyte layer and perpendicular to the length direction of the capacitor element. The section passes through the center of the solid electrolyte layer in a direction parallel to the length direction of the capacitor element. In this way, the sample for measurement (sample A) is obtained.

A direction from an end of the anode body at a side close to the anode lead-out part toward an end of the anode body at a side close to the cathode formation part is referred to as a length direction of the anode body or the capacitor element. The solid electrolyte layer has a length in a direction parallel to the length direction of the capacitor element. The direction from the end of the anode body at a side close to the anode lead-out part toward the end of the anode body at a side close to the cathode formation part is parallel to a linear direction connecting the center of the end surface of the anode body at a side close to the anode lead-out part and the center of the end surface of the anode body at a side close to the cathode formation part.

Examples of the conjugated polymer contained in the first conductive polymer and the second conductive polymer include known conjugated polymers used in solid electrolytic capacitors, such as π-conjugated polymers. Examples of the conjugated polymer include polymers having polypyrrole, polythiophene, polyaniline, polyfuran, polyacetylene, polyphenylene, polyphenylene vinylene, polyacene, and polythiophene vinylene as a basic skeleton. Among these polymers, a polymer that adopts polypyrrole, polythiophene, or polyaniline as a basic skeleton is preferable. The polymer is required to contain at least one kind of monomer unit constituting the basic skeleton. The monomer unit also includes a monomer unit having a substituent. Examples of the polymer include a homopolymer and a copolymer of two or more kinds of monomer. For example, polythiophene includes poly (3,4-ethylenedioxythiophene) and the like.

Each of the first conductive polymer and the second conductive polymer may contain one kind of conjugated polymer, or may contain two or more kinds of conjugated polymers in combination.

Each of the conductive polymers preferably contains a conjugated polymer containing a monomer unit corresponding to a thiophene compound. Such a conjugated polymer has large expansion and contraction during charging and discharging, and thus peeling easily occurs between the porous part and the first layer or between the first layer and the second layer. However, the present disclosure causes the first layer to include the inner layer and the outer layer of the first layer to have a large thickness, so that high adhesion can be obtained. Thus, even when such a conjugated polymer is used, peeling between the porous part and the first layer and between the first layer and the second layer can be suppressed. Thus, a decrease in electrostatic capacity when the solid electrolytic capacitor is repeatedly used can be further suppressed. High pressure resistance also can be secured.

Examples of the thiophene compound include a compound having a thiophene ring and capable of forming a repeated structure of a corresponding monomer unit. The thiophene compound may have a substituent at at least one of the 3- and 4-positions of the thiophene ring, for example. The substituent at the 3-position and the substituent at the 4-position may be linked to form a ring fused to a thiophene ring. Examples of the thiophene compound include thiophene which may have a substituent at at least one of the 3- and 4-positions and an alkylene dioxythiophene compound ($C_{2-4}$ alkylenedioxythiophene compounds such as ethylenedioxythiophene compounds, and the like). The alkylene dioxythiophene compound also includes those having a substituent in a part of an alkylene group. The substituent is preferably, but is not limited to, an alkyl group ($C_{1-4}$ alkyl groups such as methyl group and ethyl group, and the like), an alkoxy group ($C_{1-4}$ alkoxy groups such as methoxy group and ethoxy group, and the like), a hydroxy group, a hydroxyalkyl group (a hydroxy $C_{1-4}$ alkyl group such as a hydroxymethyl group, and the like), or the like. Among them, a conjugated polymer (such as PEDOT) containing at least a monomer unit corresponding to a 3,4-ethylenedioxythiophene compound (such as 3,4-ethylenedioxythiophene (EDOT)) is preferable. The conjugated polymer including at least a monomer unit corresponding to EDOT may include only a monomer unit corresponding to EDOT, or may include a monomer unit corresponding to a thiophene compound other than EDOT in addition to the monomer unit.

The conjugated polymer has a weight-average molecular weight (Mw) that is not particularly limited, and that is in a range from 1,000 to 1,000,000, inclusive, for example.

The weight-average molecular weight (Mw) herein is a value in terms of polystyrene measured by gel permeation chromatography (GPC). The GPC is typically measured using a polystyrene gel column, and water and methanol (volume ratio: 8/2) as a mobile phase.

Each of the first conductive polymer and the second conductive polymer may further contain a dopant. Examples of the dopant include at least one kind selected from a group consisting of an anion and a polyanion.

Examples of the anion include a sulfate ion, a nitrate ion, a phosphate ion, a borate ion, an organic sulfonate ion, and a carboxylate ion. Examples of the dopant that generates sulfonate ions include benzenesulfonic acid, p-toluenesulfonic acid and naphthalenesulfonic acid.

Examples of the polyanion include a polymer-type polysulfonic acid and a polymer-type polycarboxylic acid. Examples of the polymer type polysulfonic acid include polyvinyl sulfonic acid, polystyrenesulfonic acid, polyallylsulfonic acid, polyacrylsulfonic acid, polymethacrylsulfonic acid, and derivatives thereof. Examples of the polymer type polycarboxylic acid include polyacrylic acid, polymethacrylic acid, and derivatives thereof. Examples of the derivative include a substituted product having a substituent, a partially esterified product, and a copolymer containing a sulfonic acid unit or a carboxylic acid unit and another monomer unit. The polyanion also includes a polyester sulfonic acid and a phenolsulfonic acid novolak resin. However, the polyanion is not limited thereto.

From the viewpoint of easily suppressing dedoping, it is advantageous to use a dopant (e.g., a sulfonate ion, a polysulfonic acid of a polymer type) having a relatively high electron withdrawing property. Even from the viewpoint of allowing a solid electrolyte layer to easily secure high conductivity, using a sulfonate ion or a polysulfonic acid of a polymer type as a dopant is preferable.

The dopant of a polymer type generally has a large molecular size and is less likely to fill the voids in the porous part. As described above, the present disclosure allows the first layer to be formed by applying the treatment liquid containing the first conductive polymer to the main surface of the porous part including the dielectric layer while the main surface of the porous part is directed vertically upward, and drying the treatment liquid. Thus, even when the first conductive polymer contains a dopant of a polymer type, a relatively large amount of the first conductive polymer can fill the voids of the porous part, and thus high adhesion between the porous part and the first layer can be secured. Then, the first layer containing the dopant of a polymer type suppresses deterioration of the first conductive polymer even when the solid electrolytic capacitor is exposed to a high temperature, and thus high heat resistance is obtained.

Each of the anion and the polyanion may be contained in each layer constituting the solid electrolyte in the form of a salt. In each layer, each of the anion and the polyanion may form a complex together with a conjugated polymer. For example, a sulfonic acid group may be contained in a free form (—$SO_3H$), an anion form (—$SO_3^-$), or a salt form, or may be contained in a form bonded to or interacting with the conjugated polymer, in each layer. The sulfonic acid groups in all these forms herein may be simply referred to as a "sulfonic acid group". Similarly, a carboxy group may be contained in a free form (—COOH), an anion form (—$COO^-$), or a salt form, or may be contained in a form bonded or interacting with the conjugated polymer, in each layer. The carboxy groups in all these forms herein may be simply referred to as a "carboxy group".

The amount of the dopant contained in each layer constituting the solid electrolyte layer is in a range from 10 parts by mass to 1000 parts by mass, inclusive, and may be in a range from 20 parts by mass to 500 parts by mass, inclusive, or from 50 parts by mass to 200 parts by mass, inclusive, with respect to 100 parts by mass of the conjugated polymer, for example.

Each layer constituting the solid electrolyte layer may contain an additive agent as necessary. Examples of the additive agent include a known additive agent (e.g., a coupling agent and a silane compound) added to the solid electrolyte layer, a known conductive material other than the conductive polymer, and a water-soluble polymer. Each layer constituting the solid electrolyte layer may contain one kind of these additive agents, or may contain two or more kinds of these additive agents in combination.

Examples of the conductive material as the additive agent include at least one kind selected from a group consisting of conductive inorganic materials such as manganese dioxide and TCNQ complex salts.

Examples of the water-soluble polymer include a water-soluble polymer compound having a hydrophilic group in a main chain or a side chain. The dopant of a polymer type is also contained in a water-soluble polymer. Examples of the hydrophilic group of the water-soluble polymer include a polyoxyalkylene chain, a hydroxy group, and an acid group (carboxy group, sulfonic acid group, etc.). As the water-soluble polymer, a component having lower electron withdrawing properties than the dopant is typically used. Examples of such a water-soluble polymer include a water-soluble polymer having at least one kind selected from a group consisting of a carboxy group, a hydroxy group, and a polyoxyalkylene chain. Examples of the water-soluble polymer include at least one kind selected from a group consisting of a polyalkylene glycol compound, a water-soluble polyurethane, a water-soluble polyamide, a water-soluble polyimide, a water-soluble acrylic resin, and polyvinyl alcohol. Use of the water-soluble polymer is advantageous in reducing a leak current and enhancing pressure resistance because variation in thickness of the solid electrolyte layer is easily reduced. From such a viewpoint, the second layer preferably contains the water-soluble polymer. The first layer may or may not contain the water-soluble polymer.

Each of the carboxy group and the sulfonic acid group of the water-soluble polymer may be contained in each layer constituting the solid electrolyte layer in a free form, an anion form, or a salt form as in the dopant. Then, a part of each of the carboxy group and the sulfonic acid group may be contained in each layer in a form of bonding or interacting with the conjugated polymer. The carboxy group in all these forms herein may be simply referred to as a "carboxy group", and the sulfonic acid group in all these forms herein may be simply referred to as a "sulfonic acid group".

Between the dielectric layer and the first layer (or the solid electrolyte layer), a layer or the like for enhancing adhesion may be interposed as necessary. Between not only the first layer and the second layer, but also the layers constituting the second layer, at least one kind selected from a group consisting of a surface adjusting agent (surfactant or the like), a cationic agent, and an anionic agent may be interposed as necessary.

The outer layer of the first layer and the second layer have an average total thickness that is in a range from 5 μm to 20 μm, and that may be in a range from 10 μm to 15 μm, for example. The total thickness of the outer layer of the first layer and the second layer is a thickness of a part of the solid electrolyte layer, the part protruding outward from the main surface of the anode body including the dielectric layer. The average total thickness is determined according to the measurement of thickness Tm of the outer layer.

(Formation of Solid Electrolyte Layer)

When the solid electrolytic capacitor of the present disclosure is manufactured, the first layer is formed using the treatment liquid (first treatment liquid) containing the first conductive polymer as described above. In the step of forming the first layer, the first treatment liquid is first applied to one main surface of the porous part including the dielectric layer while the one main surface is directed vertically upward. Next, the other main surface of the porous part including the dielectric layer is directed vertically upward, and in this state, the first treatment liquid is applied to the other main surface. Then, a coating film formed using the first treatment liquid is dried. As a result, the inner layer and the outer layer are formed on each of the main surfaces. When the first treatment liquid is applied to the main surface that is directed vertically upward, a large amount of the first conductive polymer adheres to the anode body, and thus adhesion between the dielectric layer and the first layer and adhesion between the first layer and the second layer can be enhanced. Then, the first layer is formed on the end surface of the anode body including the dielectric layer such that the first treatment liquid applied to the main surface flows around through the surface and the voids of the porous part, and a coating film of the first treatment liquid is dried in this state. Thus, thickness Te of the outer layer formed on the end surface of the anode body tends to be smaller than thickness Tm of the outer layer on the main surface.

In the step of forming the first layer, a large amount of first conductive polymer can be attached to the anode body without repeating application and drying of the first treatment liquid to the same main surface. In general, when a solid electrolyte layer is formed by immersing an anode body in a treatment liquid containing a conductive polymer, the conductive polymer attached to the anode body expands as the immersion and the drying are repeated. Thus, the solid electrolyte layer is formed varying remarkably in thickness, thereby easily affecting capacitor performance. Manufacture of the solid electrolytic capacitor of the present disclosure enables reducing the number of times of drying in the step of forming the first layer as compared with that of conventional solid electrolytic capacitors, so that variations in thickness of the solid electrolyte layer can be reduced, and excellent capacitor performance can be secured. For example, a large amount of first conductive polymer can be attached to the anode body even when application and drying of the first treatment liquid are performed twice or less, or once for each main surface, for example. After the first treatment liquid is applied to one main surface and before the first treatment liquid is applied to the other main surface, the coating film of the first treatment liquid formed on the one main surface may be dried, and preferably is not dried. This is because the number of times of drying can be reduced, and the variation in thickness of the solid electrolyte layer can be further reduced.

The application of the first treatment liquid is only required to be performed while each main surface of the porous part including the dielectric layer is directed vertically upward. The first treatment liquid may be applied to each main surface by at least one selected from a group consisting of dripping, discharging (e.g., discharge using a spray, a dispenser, or the like), and transferring, for example. Such a method is advantageous in increasing thickness Tm of the outer layer on the main surface.

The first treatment liquid is prepared by dispersing or dissolving components of the first treatment liquid in a liquid medium. Examples of the components include a first conductive polymer (conjugated polymer, dopant, etc.) and an additive agent. The first treatment liquid may be prepared by polymerizing a precursor (monomer or the like) of the conjugated polymer in a liquid medium in the presence of a dopant as necessary. For the first conductive polymer and the additive agent, the description of the first layer (or the second layer) can be referred to. In general, when a solid electrolyte layer is formed by immersion using a dispersion liquid of a conductive polymer, particles of the conductive polymer contained in the dispersion liquid are less likely to fill voids of a porous part, and thus adhesion between a dielectric layer and a solid electrolyte layer is less likely to be enhanced. The present disclosure allows the first treatment liquid to be applied to the main surface while the main surface is directed vertically upward, even when the dispersion liquid in which the first conductive polymer is dispersed is used as the first treatment liquid, and thus the first treatment liquid is easily permeated into the voids of the porous part to easily fill the voids with the first conductive polymer. Thus, high adhesion between the dielectric layer and the first layer can be secured by the inner layer of the first layer in the voids.

The first treatment liquid may contain one kind of conjugated polymer, or may contain two or more kinds thereof in combination. The first treatment liquid may contain one kind of dopant, or may contain two or more kinds thereof in combination. The first treatment liquid may contain one kind of additive agent, or may contain two or more kinds thereof in combination.

Examples of the liquid medium used for the first treatment liquid include water and an organic medium. The liquid medium is only required to be liquid at least at a temperature at which the first treatment liquid is applied to the porous part, and may be liquid at room temperature (e.g., in a range from 20° C. to 35° C.). Examples of the organic medium include aliphatic alcohols, aliphatic ketones (such as acetone), nitriles (Acetonitrile, benzonitrile, etc.), amides (N, N-dimethylformamide, etc.), and sulfoxides (such as dimethyl sulfoxide). The aliphatic alcohol may be either monool or polyol. The first treatment liquid may contain one kind of liquid medium, or may contain two or more kinds thereof in combination.

The first conductive polymer in the first treatment liquid has a concentration in a range from 0.5% by mass to 5% by mass, inclusive, for example, and may be in a range from 1% by mass to 4% by mass, inclusive, or from 1% by mass to 3.5% by mass, inclusive. The concentration in such a range facilitates attaching a large amount of the first conductive polymer to the first main surface while the first conductive polymer is permeated into the porous part.

The first conductive polymer in the first treatment liquid has a mean particle size in a range from 100 nm to 600 nm, inclusive, for example, and may have a mean particle size in a range from 200 nm to 500 nm, inclusive. Although the mean particle size in such a range causes a difficulty in filling pits of the porous part with the first conductive polymer by an immersion method, the mean particle size enables enhancing filling ability of the first conductive polymer into the pits in the present disclosure.

The mean particle size of the first conductive polymer is a cumulative 50% particle size (median diameter) of particles of the first conductive polymer in the first treatment liquid in a volume-based particle size distribution measured using a particle size distribution measuring device of a dynamic light scattering method. As the particle size distribution measuring device by the dynamic light scattering method, for example, a light scattering photometer DLS-8000 manufactured by Otsuka Electronics Co., Ltd. is used.

The first treatment liquid may be applied to the porous part under reduced pressure or under increased pressure. These cases are advantageous in that the first treatment liquid is rapidly permeated into the voids. The first treatment liquid may be applied to the porous part under atmospheric pressure as necessary.

The first treatment liquid applied to the main surface may be dried under heating or under reduced pressure, for example. Drying temperature and pressure may be determined depending on a kind of the liquid medium contained in the first treatment liquid.

The second layer is formed by treating the anode body (specifically, the cathode formation part) on which the first layer is formed with a treatment liquid (second treatment liquid) containing a second conductive polymer or a precursor of a conjugated polymer. For example, the second treatment liquid containing the second conductive polymer is applied to the anode body on which the first layer is formed, and a coating film of the second treatment liquid is dried to form the second layer. The second treatment liquid may be applied to the anode body repeatedly multiple times as necessary. Additionally, the second layer containing the second conductive polymer containing the conjugated polymer and the dopant as necessary may be formed by polymerizing the precursor by chemical polymerization or electrolytic polymerization while the anode body (specifically, the cathode formation part) in which the first layer is formed is immersed in the second treatment liquid containing the precursor of the conjugated polymer and the dopant as necessary. The anode body after the polymerization is washed and dried as necessary. The polymerization may be performed multiple times as necessary.

In the step of forming the second layer, the second treatment liquid may be brought into contact with the anode body on which the first layer is formed while covering at least the first layer. For example, the second layer may be formed in the same manner as the step of forming the first layer except that the second treatment liquid is used instead of the first treatment liquid. The second layer also may be formed using the second treatment liquid by a conventional method for forming a solid electrolyte layer, such as immersion, injection, or coating (spray coating, printing, etc.). These methods may be combined as necessary.

The second treatment liquid is prepared by dissolving or dispersing components of the second treatment liquid in a liquid medium. Examples of the components include a conjugated polymer or a precursor thereof, a dopant, and an additive agent. For each component, the description of the second layer (or the first layer) can be referred to.

The second treatment liquid may contain one kind of conjugated polymer, or may contain two or more kinds thereof in combination.

Examples of the precursor of the conjugated polymer include monomers, oligomers, and prepolymers of the conjugated polymer. The second treatment liquid may contain one kind of precursor or two or more kinds of precursor.

When the second treatment liquid containing the precursor of the conjugated polymer is used, an oxidizing agent is used to polymerize the precursor. The oxidizing agent may be contained in the second treatment liquid as an additive agent. Alternatively, the oxidizing agent may be applied to the anode body before or after the second treatment liquid is brought into contact with the anode body on which the first layer is formed. Examples of such an oxidizing agent include a compound capable of generating $Fe^{3+}$ (such as a ferric sulfate), a persulfate (such as a sodium persulfate or an ammonium persulfate), and a hydrogen peroxide. The oxidizing agent may be used with one kind thereof or two or more kinds thereof in combination.

The second treatment liquid may contain one kind of dopant, or may contain two or more kinds thereof in combination. The second treatment liquid may contain one kind of additive agent, or may contain two or more kinds thereof in combination.

(Cathode Lead-Out Layer)

The cathode lead-out layer may have a single-layer structure or a multilayer structure. Examples of the cathode lead-out layer include a layer containing conductive particles and metal foil. Examples of the conductive particles include at least one kind selected from conductive carbon and metal powder. The cathode lead-out layer may include, for example, a layer containing conductive carbon (also referred to as a carbon layer) covering the solid electrolyte layer, and a layer containing metal powder or metal foil, covering the carbon layer. The cathode lead-out layer may be formed of metal foil covering the solid electrolyte layer.

Examples of the conductive carbon include graphite such as artificial graphite or natural graphite. The carbon layer can be formed by immersing the anode body on which the solid electrolyte layer is formed in a dispersion liquid containing conductive carbon, or applying a paste containing conductive carbon to a surface of the solid electrolyte layer. The dispersion liquid and the paste are prepared by dispersing conductive carbon in an aqueous liquid medium, for example.

Examples of the metal powder include silver particles and silver alloy particles. The layer containing metal powder can be formed by layering a paste containing metal powder on a surface of a base layer (specifically, the carbon layer), for example. The paste is prepared by mixing metal powder, a resin (binder resin), and a liquid medium as necessary, for example. Although a thermoplastic resin is available for the resin, use of a thermosetting resin such as an imide resin or an epoxy resin is preferable.

The type of metal constituting the metal foil is not particularly limited. The metal foil is preferably formed using a valve metal such as aluminum, tantalum, or niobium, or an alloy containing the valve metal. The metal foil has a surface that may be roughened as necessary. The surface of the metal foil may be provided with an anodization film, and may be provided with a film of metal (dissimilar metal) different from the metal constituting the metal foil, or a nonmetal film. Examples of the dissimilar metal include metals such as titanium. Examples of the nonmetal include carbon such as conductive carbon. The cathode lead-out layer may include a coating film of a dissimilar metal or a non-metal (e.g., conductive carbon) covering the solid electrolyte layer, and metal foil covering the coating film.

(Separator)

When the metal foil is used for the cathode lead-out layer, a separator may be disposed between the metal foil and the anode body. Available examples of the separator include, but are not particularly limited to, an unwoven fabric including fibers of cellulose, polyethylene terephthalate, vinylon, and polyamide (e.g., aliphatic polyamide or aromatic polyamide such as aramid).

(Others)

The solid electrolytic capacitor may be a wound type, or may be either a chip type or a stacked type. The solid electrolytic capacitor is required to include at least one capacitor element, and may include multiple capacitor elements. For example, the solid electrolytic capacitor may include a stack body of two or more capacitor elements. When the solid electrolytic capacitor includes the multiple capacitor elements, each of the capacitor elements may be a wound type or a stacked type, for example. The capacitor element may have a configuration selected suitable for the type of the solid electrolytic capacitor.

The capacitor element includes the cathode lead-out layer to which one end part of a cathode lead is electrically connected. The anode body is electrically connected to one end part of an anode lead. The anode lead and the cathode lead each have another end part that is drawn out from a resin exterior body or a case. The other end part of each lead exposed from the resin exterior body or the case is used for solder connection or the like to a substrate on which the solid electrolytic capacitor is to be mounted. As each lead, a lead wire may be used, or a lead frame may be used.

The capacitor element is sealed using the resin exterior body or the case. For example, the capacitor element and a material resin (e.g., uncured thermosetting resins and fillers) of the exterior body may be housed in a mold, and the capacitor element may be sealed with the resin exterior body by a transfer molding method, a compression molding method, or the like. At this time, a part close to the other end part of the anode lead, and a part close the other end part of the cathode lead, the parts being drawn out from the capacitor element, are each exposed from the mold. Then, the solid electrolytic capacitor may be formed by housing the capacitor element in a bottomed case while the part close to the other end part of the anode lead and the part close the other end part of the cathode lead are positioned close to an opening of the bottomed case, and sealing the opening of the bottomed case with a sealing body.

Figure 2:
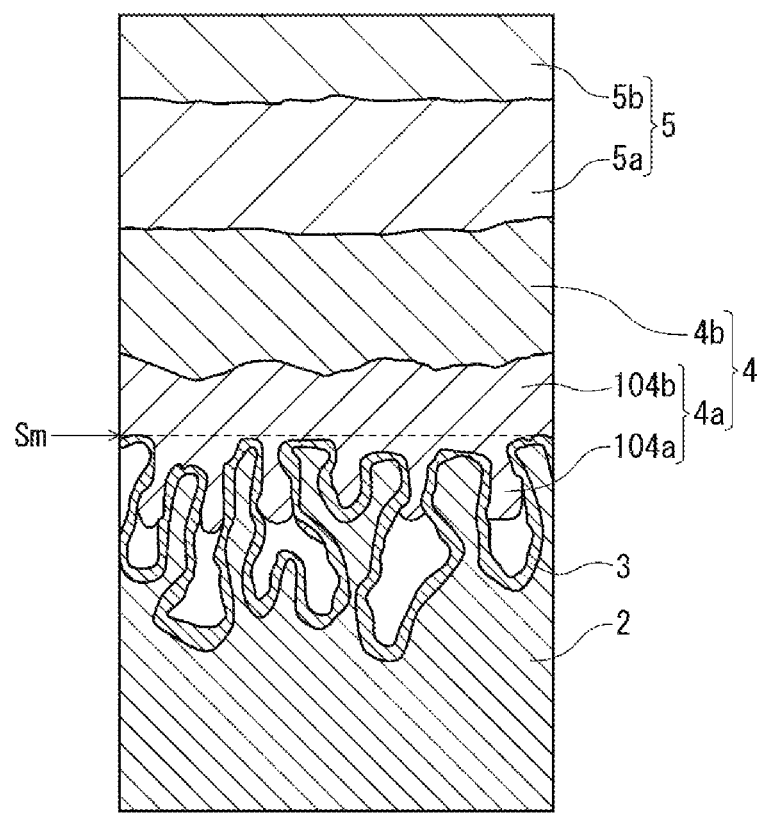
FIG. 2 is an enlarged view illustrating an area surrounded by solid line a in FIG. 1.

FIG. 1 is a schematic sectional view illustrating a solid electrolytic capacitor according to an exemplary embodiment of the present disclosure. FIG. 2 is an enlarged view conceptually illustrating a region surrounded by solid line a in FIG. 1.

Solid electrolytic capacitor 1 includes capacitor element 11, resin exterior body 12 that seals capacitor element 11, and anode terminal 13 and cathode terminal 14 that are exposed to the outside of resin exterior body 12. Capacitor element 11 includes anode body 2 in a sheet shape with a surface layer including a porous part, dielectric layer 3 covering at least a part of the porous part of anode body 2, and cathode part 15 covering at least a part of dielectric layer 3. Anode body 2 includes one part where cathode part 15 is formed, the one part being a cathode formation part, and another part where cathode part 15 is not formed, the other part being an anode lead-out part. Anode terminal 13 is electrically connected to an end part of anode body 2, which is located at a side close to the anode lead-out part. Cathode terminal 14 is electrically connected to cathode part 15. Resin exterior body 12 has a substantially rectangular parallelepiped outer shape, and solid electrolytic capacitor 1 accordingly has a substantially rectangular parallelepiped outer shape.

Anode body 2 and cathode part 15 face each other with dielectric layer 3 interposed between anode body 2 and cathode part 15. Cathode part 15 includes solid electrolyte layer 4 covering dielectric layer 3, and cathode lead-out layer 5 covering solid electrolyte layer 4. Cathode lead-out layer 5 in the illustrated example has a two-layer structure, and includes carbon layer 5a in contact with solid electrolyte layer 4, and metal paste layer 5b covering a surface of carbon layer 5a.

In a region of the anode lead-out part protruding from cathode part 15 in of anode body 2, which is located at side close to cathode part 15, insulating separation part 16 is formed to cover a surface of anode body 2 in a band shape. Insulating separation part 16 restricts contact between cathode part 15 and anode body 2. Anode body 2 includes an end part protruding from cathode part 15, the end part being electrically connected to one end part 13a of anode terminal 13 by welding or the like. Then, cathode lead-out layer 5 formed as an outermost layer of cathode part 15 is electrically connected to one end part 14a of cathode terminal 14 with conductive adhesive 17 (e.g., a mixture of a thermosetting resin and metal particles) interposed therebetween. Another end part 13b of anode terminal 13 and another end 14b of cathode terminal 14 are respectively drawn out from different side surfaces of resin exterior body 12, and extend to one principal flat face (a lower surface in FIG. 1) in an exposed state. Each terminal includes an exposed part on the flat face, the exposed part being used for solder connection to a substrate (not illustrated in the drawings) on which electrolytic capacitor 1 is to be mounted, for example.

Dielectric layer 3 is formed on a part of a surface of a conductive material constituting anode body 2. Dielectric layer 3 is formed by anodizing the surface of the conductive material constituting anode body 2, for example. Thus, dielectric layer 3 is formed along a surface (including inner wall surfaces of voids) of the porous part of anode body 2 as illustrated in FIG. 2.

First layer 4a containing the first conductive polymer is formed covering dielectric layer 3, and second layer 4b containing the second conductive polymer is formed covering first layer 4a. First layer 4a includes inner layer 104a disposed in the voids of the porous part including dielectric layer 3, and outer layer 104b disposed outside main surface Sm or an end surface of the porous part including dielectric layer 3. The present disclosure enables an increase in thickness of outer layer 104b disposed outside main surface Sm of the porous part including dielectric layer 3, and thus enables enhancement of adhesion not only between dielectric layer 3 and first layer 4a but also between first layer 4a and second layer 4b.

EXAMPLES

Hereinafter, the present invention is specifically described with reference to examples and comparative examples, but the present invention is not limited to the following examples.

<<Solid Electrolytic Capacitor Element A1>>

Capacitor element 11 (solid electrolytic capacitor element A1) of solid electrolytic capacitor 1 illustrated in FIG. 1 was prepared in the following manner, and its characteristics were evaluated.

(1) Preparation of Anode Body 2

Opposite surfaces of aluminum foil (thickness: 100 μm) as a base material were roughened by etching. In this way, anode body 2 in a sheet shape including a porous part in a surface layer was produced.

(2) Formation of Dielectric Layer 3

A cathode formation part of anode body 2 was immersed in an anodizing solution, and a DC voltage of 70 V was applied thereto for 20 minutes. In this way, dielectric layer 3 containing aluminum oxide was formed on a surface of the porous part of anode body 2.

(3) Formation of First Layer 4a

Anode body 2 including dielectric layer 3 obtained in section (2) above was placed on a flat table while one main surface of anode body 2 is directed vertically upward, and 2 μl of a first treatment liquid was dripped onto the one main surface of anode body 2. Next, anode body 2 was inverted, and the other main surface was directed vertically upward. In this state, 2 μl of the first treatment liquid was dripped onto the other main surface of anode body 2, and drying was performed at 120° C. for 5 minutes to 10 minutes. As described above, 2 μl of the first treatment liquid was dripped onto each main surface to form first layer 4a containing the first conductive polymer while covering a surface of dielectric layer 3. As the first treatment liquid, an aqueous dispersion liquid was used, the aqueous dispersion liquid containing a conductive polymer (poly 3,4-ethylenedioxythiophene (PEDOT) and polystyrene sulfonic acid (PSS)) at a concentration of 2% by mass (the conductive polymer in the dispersion liquid has a mean particle size of 400 nm).

(4) Formation of Second Layer 4b

Anode body 2 including first layer 4a obtained in section (3) above was immersed in a second treatment liquid, then taken out, and further dried at 120° C. for 10 minutes to 30 minutes. Second layer 4b containing the second conductive polymer was formed covering a surface of first layer 4a by alternately repeating the immersion in the second treatment liquid and the drying twice additionally. As the second treatment liquid, an aqueous dispersion liquid was used, the aqueous dispersion liquid containing the conductive polymer (PEDOT and PSS derivative) at a concentration of 4% by mass (the conductive polymer in the dispersion liquid has a mean particle size of 600 nm).

In this way, solid electrolyte layer 4 including first layer 4a and second layer 4b was formed covering the surface of dielectric layer 3.

(5) Formation of Cathode Lead-Out Layer 5

Anode body 2 including solid electrolyte layer 4 obtained in section (4) above was immersed in a dispersion liquid in which graphite particles were dispersed in water, taken out from the dispersion liquid, and then dried to form carbon layer 5a at least on a surface of second layer 4b. Drying was performed at a temperature in a range from 130° C. to 180° C. for 10 minutes to 30 minutes.

Then, a silver paste containing silver particles and a binder resin (epoxy resin) was applied onto the surface of carbon layer 5a, and heated at a temperature in a range from 150° C. to 200° C. for 10 minutes to 60 minutes to cure the binder resin, thereby forming metal paste layer 5b. Cathode lead-out layer 5 including carbon layer 5a and metal paste layer 5b was thus formed.

Twenty capacitor elements A1 in total were produced as described above.

<<Solid Electrolytic Capacitor Element A2>>

Unlike solid electrolytic capacitor A1 in section (3), 1 μl of the first treatment liquid was dripped onto each main surface. Except this, capacitor element A2 was produced as the same manner with capacitor element A1.

<<Solid Electrolytic Capacitor Element A3>>

Unlike solid electrolytic capacitor A1 in section (3), 0.5 μl of the first treatment liquid was dripped onto each main surface. Except this, capacitor element A3 was produced as the same manner with capacitor element A1.

(6) Evaluation

Capacitor elements (A1 to A3) were used to be evaluated as follows.

(a) Measurement of Thickness of Outer Layer 104b

According to the procedure described above, thickness Tm of the outer layer disposed outside the main surface of the porous part and thickness Te of the outer layer disposed outside the end surface were determined in first layer 4a of solid electrolyte layer 4 in each capacitor element. Then, an average value of each thickness was acquired by averaging measurements of twenty capacitor elements.

(b) Electrostatic Capacity and ESR

Under an environment of 20° C., initial electrostatic capacity (μF) of each capacitor element at a frequency of 120 Hz was measured, and initial ESR (mΩ) at a frequency of 100 kHz was measured using an LCR meter for 4-terminal measurement. Then, an average value of twenty capacitor elements was obtained.

Next, under an environment of 70° C., rated voltage was applied to the capacitor element for 20 seconds, and the application of the voltage was stopped for 20 seconds. The application of the voltage and the stop of the application were repeated 10,000 times to perform an acceleration test. Each of the electrostatic capacity and the ESR after the acceleration test was measured under an environment of 20° C. in a procedure similar to that for the initial electrostatic capacity and the ESR, and an average value of 20 capacitor elements was obtained. The electrostatic capacity and the ESR in the accelerated test were each expressed as a ratio with respect to the corresponding one of the initial electrostatic capacity and the ESR, the one being expressed as 100%.

<<Solid Electrolytic Capacitor Element B1>>

The first layer was formed by immersion in the first treatment liquid. More specifically, anode body 2 including dielectric layer 3 was immersed in the first treatment liquid, then taken out, and dried at 120° C. for 5 minutes to 10 minutes. The first layer containing the first conductive polymer was formed covering dielectric layer 3 by alternately repeating the immersion in the first treatment liquid and the drying twice additionally. Except this, twenty capacitor elements in total were prepared and evaluated as the same manner with Example 1.

<<Solid Electrolytic Capacitor Element B2>>

Unlike solid electrolytic capacitor A1 in section (3), 0.2 μl of the first treatment liquid was dripped onto each main surface. Except this, capacitor element B2 was produced and evaluated as the same manner with capacitor element A1.

Evaluation results are shown in Table 1. Table 1 shows A1 to A3 that represent Examples 1 to 3, respectively, and B1 and B2 that represent Comparative Examples 1, 2, respectively.

TABLE 1

|  | Tm (μm) | Te (μm) | Tm/Te | Electrostatic capacity after acceleration test (%) | ESR after acceleration test (%) |
|---|---|---|---|---|---|
| A1 | 2.8 | ≤0.1 | ≥28 | 81.6 | 111.6 |
| A2 | 1.8 | ≤0.1 | ≥18 | 76.3 | 128.3 |
| A3 | 1.3 | ≤0.1 | ≥13 | 70.5 | 141.6 |
| B1 | ≤0.1 | ≤0.1 | ≈1 | 11.2 | 277.3 |
| B2 | ≤0.1 | ≤0.1 | ≈1 | 13.5 | 251.4 |

As shown in Table 1, Comparative Example 1 in which the first layer was formed by immersion shows that after the acceleration test, the electrostatic capacity significantly decreases, and the ESR significantly increases. As with Comparative Example 1, Comparative Example 2 also shows that after the accelerated test, the electrostatic capacity significantly decreased, and the ESR significantly increased. In contrast, Examples 1 to 3 each show that both decrease in electrostatic capacity and increase in ESR after the acceleration test are suppressed lower than those in Comparative Examples 1 and 2. Comparative Example 1 was configured such that almost no outer layer was formed on the main surface of the anode body, and the main surface and the end surface had almost no difference in thickness of the outer layer. Then, Comparative Example 2 was similar in the dripping process to that in Examples 1 to 3 except that the amount of dripping was small, and was configured such that almost no outer layer was formed on the main surface of the anode body, and the main surface and the end surface had almost no difference in thickness of the outer layer, as in Comparative Example 1. In contrast, Examples 1 to 3 were each configured such that the outer layer had a large thickness on the main surface of the anode body. Additionally, it is considered that a relatively large amount of the first treatment liquid was also filled in the voids of the porous part because not only the first treatment liquid was applied to the main surface while the main surface was directed vertically upward, but also the gas was likely to escape from the end surface. Thus, it is considered that excellent capacitor performance as described above was obtained even after the acceleration test under severe conditions because adhesion between the inner layer and the outer layer was increased as adhesion between the first layer and the second layer was improved by the outer layer, and thus resulting in improvement of adhesion between the dielectric layer and the solid electrolyte layer.

The present disclosure enables reducing a decrease in electrostatic capacity when the solid electrolytic capacitor is repeatedly used, and thus enables providing a solid electrolytic capacitor having excellent reliability and high quality. Thus, the solid electrolytic capacitor can be used for various applications.

The invention claimed is:

1. A solid electrolytic capacitor comprising at least one solid electrolytic capacitor element, the at least one solid electrolytic capacitor element including:
   an anode body including a porous part in a surface layer of the anode body, the anode body having a sheet shape;
   a dielectric layer covering at least a part of the porous part; and
   a cathode part covering at least a part of the dielectric layer, wherein:
   the cathode part includes a solid electrolyte layer covering the at least the part of the dielectric layer,
   the solid electrolyte layer includes:
      a first layer containing a first conductive polymer and covering the at least the part of the dielectric layer; and
      a second layer containing a second conductive polymer and covering at least a part of the first layer,
   the first layer includes:
      an inner layer disposed in voids of the porous part; and
      an outer layer disposed outside a main surface of the porous part and an end surface of the porous part,
   a thickness Tm of the outer layer is more than or equal to 1 µm, and
   a ratio of the thickness Tm to a thickness Te is more than or equal to 10, the thickness Te being a thickness of the outer layer disposed outside the end surface.

2. The solid electrolytic capacitor according to claim 1, wherein:
   the first conductive polymer includes a conjugated polymer, and
   the conjugated polymer includes a monomer unit corresponding to a thiophene compound.

3. A method for manufacturing a solid electrolytic capacitor, the solid electrolytic capacitor including at least one solid electrolytic capacitor element, the at least one solid electrolytic capacitor element including:
   an anode body including a porous part in a surface layer of the anode body, the anode body having a sheet shape;
   a dielectric layer covering at least a part of the porous part; and
   a cathode part covering at least a part of the dielectric layer, wherein:
   the cathode part includes a solid electrolyte layer covering the at least the part of the dielectric layer,
   the solid electrolyte layer includes:
      a first layer containing a first conductive polymer and covering the at least the part of the dielectric layer; and
      a second layer containing a second conductive polymer and covering at least a part of the first layer,
   the first layer includes:
      an inner layer disposed in voids of the porous part; and
      an outer layer disposed outside a main surface of the porous part and an end surface of the porous part,
   a thickness Tm of the outer layer is more than or equal to 1 µm,
   a ratio of the thickness Tm to a thickness Te is more than or equal to 10, the thickness Te being a thickness of the outer layer disposed outside the end surface, and
   the method comprises a step of forming the first layer by applying a treatment liquid containing the first conductive polymer to one main surface of the porous part while the one main surface is directed vertically upward, and then applying the treatment liquid to another main surface of the porous part while the another main surface is directed vertically upward, and drying the treatment liquid.

4. The method for manufacturing a solid electrolytic capacitor according to claim 3, wherein the treatment liquid is applied to each of the one main surface and the another main surface by at least one selected from the group consisting of dripping, discharging, and transferring.

\* \* \* \* \*